Feb. 26, 1946.  E. B. TIDD  2,395,697
HEATING SYSTEM
Filed Oct. 20, 1943  2 Sheets-Sheet 1
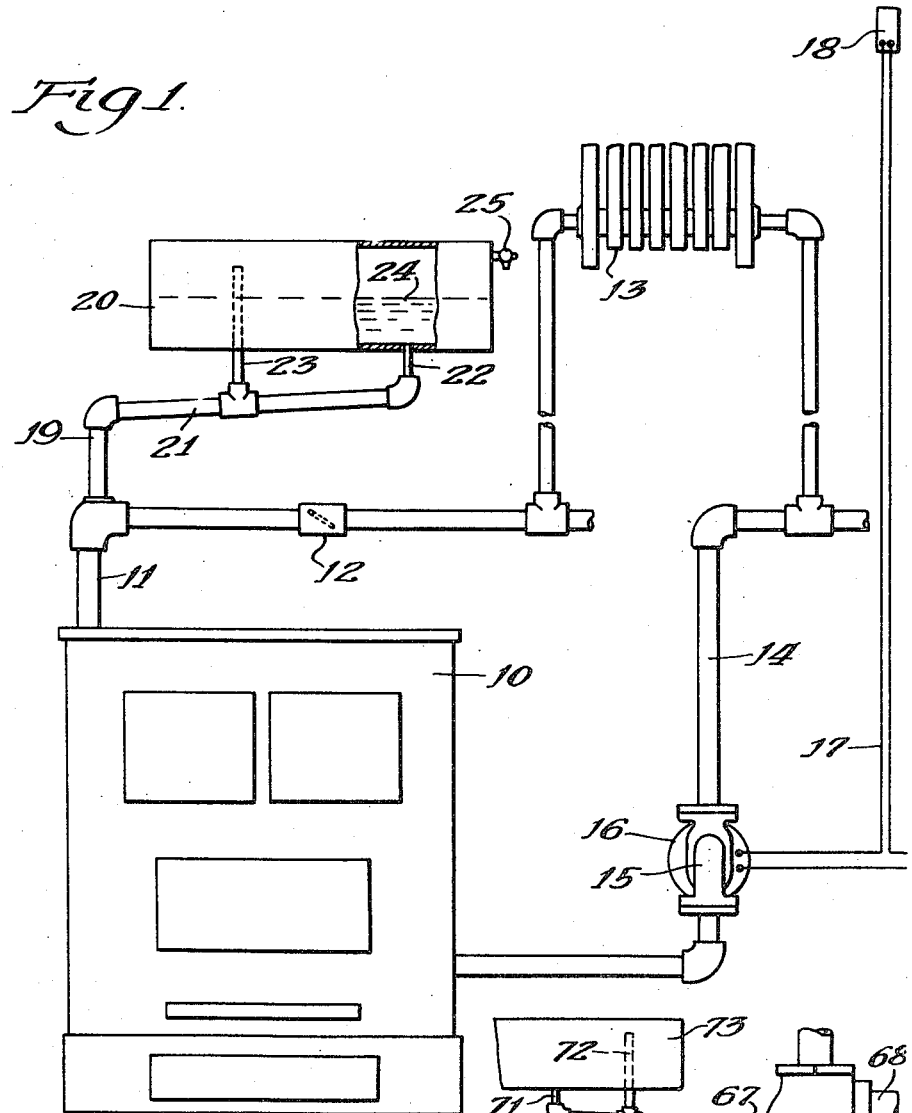
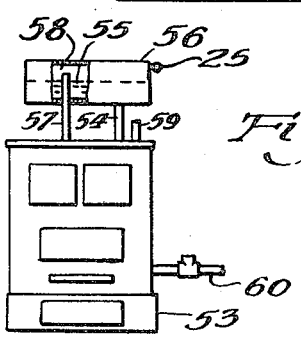
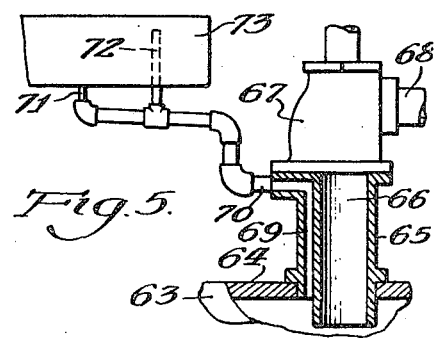

Feb. 26, 1946.  E. B. TIDD  2,395,697
HEATING SYSTEM
Filed Oct. 20, 1943  2 Sheets-Sheet 2
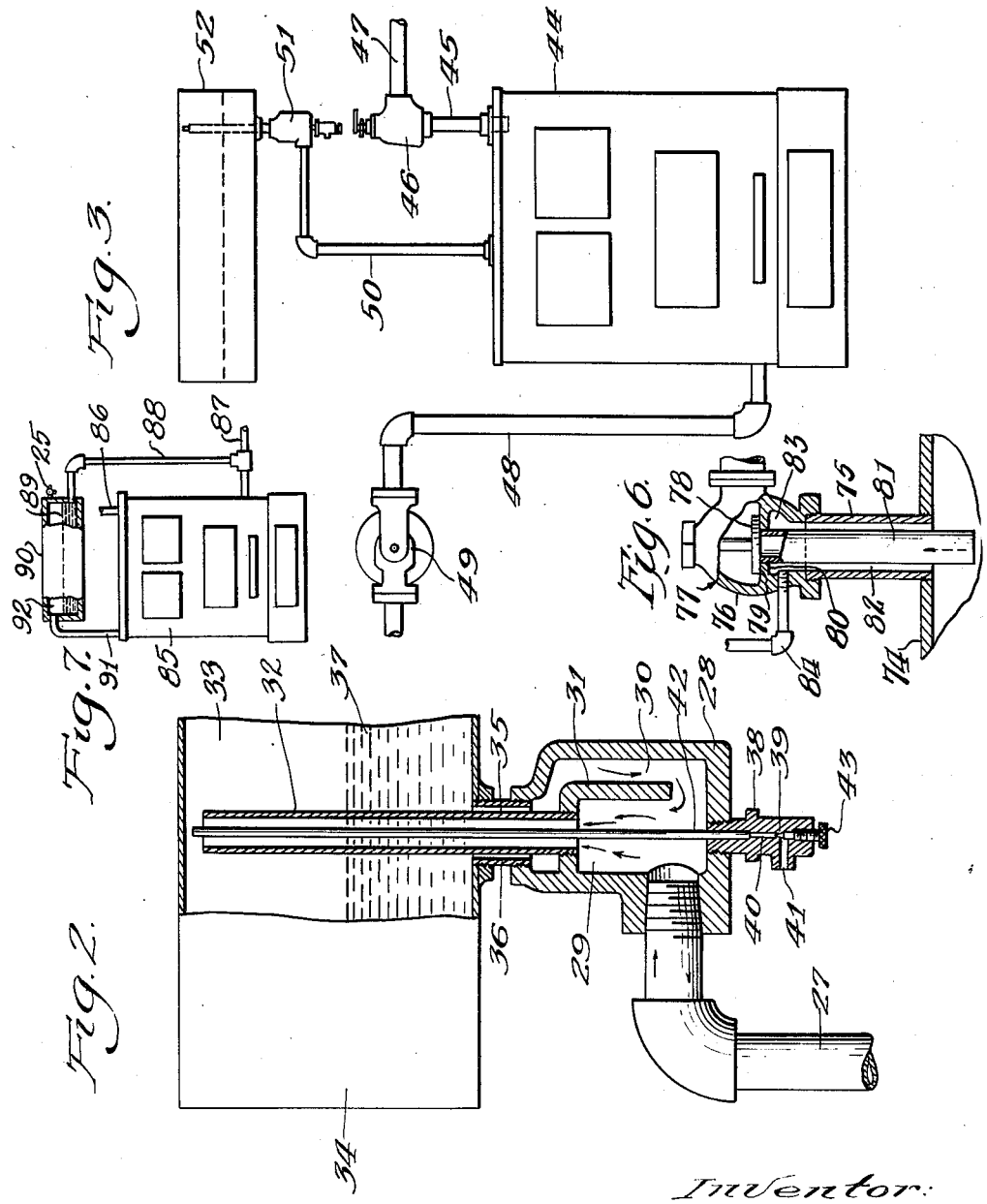
Inventor:
Edwin B Tidd
By John M Darley
Attorney Patented Feb. 26, 1946

2,395,697

UNITED STATES PATENT OFFICE 2,395,697

HEATING SYSTEM

Edwin B. Tidd, Mount Prospect, Ill., assignor to Bell & Gossett Company, Morton Grove, Ill., a corporation of Illinois Application October 20, 1943, Serial No. 507,001

25 Claims. (Cl. 237—63)

My invention relates to closed hot water heating systems and is concerned with an arrangement for trapping the air in the system at the boiler in which means are provided for facilitating the separation of air from the water for collection in an expansion tank, while maintaining the tank relatively cool.

In the older types of hot water heating systems with their large radiators and piping and an open expansion tank at the highest point in the system, the handling of air did not present a problem. The pipes and radiators were vented during filling and if some portion of one or more of the radiators afterwards developed air pockets, the operation of the system was disturbed very slightly. However, with the advent of the closed system where the water space of the tank is ordinarily connected to the boiler by a single pipe and which enabled the use of higher water temperatures, and the development of an efficient, silent circulating pump that permitted the employment of smaller diameter piping, smaller radiators and the so-called convector heaters, the formation of air bubbles at different points in the system caused trouble. These bubbles may form at the top of a convector or radiator, for example, and may partially or wholly prevent these units from acting as heat emitting agents and so reduce the efficiency of the system. I have determined that, when the pump is operating and where the pipe connecting the expansion tank to the boiler is of a size that permits two-way circulation in the same pipe, i. e., generally in excess of one-half inch, this circulation is not only sufficient to carry air bubbles from the tank to the radiators and piping, but unduly raises the temperature of the water and therefore of the air in the tank. This temperature increase may cause a system pressure high enough to open the relief valve with consequent loss of water. Moreover, when the system cools, the air in the tank cools and contracts and the system pressure may then be insufficient to maintain the filling of the topmost radiators. In either of these events, a compensating supply of fresh water then not only introduces more air into the system, but also additional sediment and causes more scale deposits.

Where the expansion tank is connected to the boiler by a single pipe of one-half inch or smaller, a common practice, an accumulation of air in this pipe will not pass to the tank because the bubbles bridge the interior of the pipe and form a definite air block. If the pipe size is increased, this air blocking does not occur, but when the pump is operating, a two-way circulation is set up in the pipe resulting in a rise in temperature of the water and air in the tank and an increase in system pressure, and a transfer of air bubbles from the tank to the remainder of the system.

It is therefore one object of my invention to provide a hot water heating system which is constructed and arranged to insure an easy and certain separation of the air from the water and its entrapment in the expansion tank.

A further object is to devise apparatus means for attachment to the expansion tank of a heating system or equivalent element which is arranged to facilitate the entrance of air into the tank by simultaneously providing for a displacement of an equal volume of water from the tank to the system.

A further object is to provide apparatus means of the type indicated wherein two-way water circulation with the expansion tank is prevented, thus maintaining the tank in a relatively cool condition and avoiding the creation of excessive pressures.

These and further objects of my invention will be set forth in the following specification, reference being had to the accompanying drawings, and the novel means by which said objects are effectuated will be definitely pointed out in the claims.

This application is a continuation-in-part of my copending application for Heating system, Ser. No. 443,903, filed May 21, 1942.

In the drawings:

Fig. 1 is a diagrammatic elevation, partly in section, of a hot water heating system embodying one form of my invention.

Fig. 2 is an enlarged sectional elevation of a modified structure for use with a heating system and intended to facilitate the separation of air from the water and its entrapment in the expansion tank.

Fig. 3 is an elevation showing a modified system equipped with the structure shown in Fig. 2.

Fig. 4 shows an alternative method of connecting the tank to the system within the scope of my invention.

Figs. 5 and 6 illustrate still further methods of connecting the expansion tank to the boiler in which a portion of the connection is embodied in the pipe fitting between the boiler and the flow control valve in the main supply line.

Fig. 7 shows a still further method of connecting the tank to the system.

Referring to Fig. 1, the numeral 10 designates a hot water boiler that may be fired in any desired manner and from the upper portion of which extends a supply pipe 11 that includes a weighted, flow control valve 12 beyond which connections are made to one or more radiators 13. The water is returned to the boiler by a pipe 14 which includes a circulating pump 15 that is driven by a motor 16 connected by an electric circuit 17 to a thermostat 18 that is positioned to be affected by the radiator.

Instead of bridging the radiator between the supply and return pipes, the so-called one-pipe system may be used without departing from the invention. In such a case, each radiator would be connected to the pipe 17 by the fittings disclosed in United States Letters Patent No. 1,663,271, this pipe also returning the water to the boiler.

To provide for expansion and to facilitate the separation of air from the water, as hereinafter described, a pipe 19 leads upwardly from the pipe 11, or may be connected directly to the upper part of the boiler. The pipe 19 is preferably of a size that will substantially prevent any formation of air pockets therein, i. e., three-fourths of an inch or larger, and beneath the expansion tank 20 includes a portion 21 of like size which may be horizontally disposed but is preferably pitched upwardly generally as indicated in Fig. 1 to facilitate the rise of air bubbles. The pipe 21 has a two branch connection with the tank 20, one branch 22 being connected to the bottom of and hence in communication with the water space of the tank, while the branch 23 extends upwardly within and terminates close to the top of the tank. Hence, during normal operation, the upper end of the latter branch is always disposed above the water level in the tank as generally indicated by the numeral 24 in Fig. 1. The pipe 22 is sized to prevent two-way circulation therein and is preferably one-half inch or smaller, while the pipe 23 is desirably of the same size, although it may be sized slightly larger provided that the temperature of the water in the tank is not increased too much by reason of two way circulation in the pipe and heat conduction through the pipe wall to the water in the tank. Preferably, the pipe 23 should not be more than one inch in diameter, it being understood that all pipe sizes refer to internal diameter. The tank 20 is also provided at the upper portion thereof with a vent valve 25.

When the system is operating, air is freed when the water passes through the boiler and this air moves upwardly through the pipe 21 and is trapped in the tank 20. This trapping includes those air bubbles that may have collected in other parts of the system, but which are eventually moved to the boiler by pump operation. Separation of air from the water in the pipe 21 at all times is facilitated by the upward pitch of the pipe and by the pipes 22 and 23. The pipe 23 provides an easy path for the air bubbles upwardly into the tank due to the fact that the pipe 22 permits displacement of water from the tank 20 as the bubbles are released. This separation is accomplished with a minimum of resistance, compared to the normal arrangement in which the expansion tank is connected to the boiler or radiator supply line by a single pipe of one-half inch or smaller. My improved arrangement also prevents over-heating of the tank and the creation of excessive pressures in the system with possible loss of water.

In Fig. 2 is illustrated a modified scheme for facilitating air separation from the water which accomplishes this result by a unit structure which may be readily connected to any expansion tank and requires only one hole in the tank as contrasted with two in the device shown in Fig. 1. Referring to Fig. 2, the numeral 27 designates a pipe corresponding in location and function to the pipe 19 in Fig. 1. The delivery end of the pipe 27 is connected to a casing 28 having chambers 29 and 30 which are partially separated by a baffle 31, the chambers communicating with each other below the lower edge of the baffle and also communicating with the pipe 27. If necessary, the latter pipe may be pitched appropriately to insure free movement of the air bubbles therethrough. The chamber 29 communicates through a pipe 32 with the air zone 33 in the upper portion of the tank 34, while the chamber 30 communicates through a passage 35 provided in a nipple 36 with the water zone 37 of the tank. The nipple surrounds the pipe 32 in spaced relation thereto and serves to connect the casing 28 to the tank. A valve plug 38 is threaded in the bottom of the casing 28 and includes a valve seat 39 providing communication between a passage 40 and a discharge passage 41. The lower end of a vent pipe 42 is mounted in the passage 40 and extends upwardly through the chamber 29 and pipe 32 into the air zone 33 and above the pipe 32 and flow through the pipe 42 is controlled by a valve 43.

During the operation of a system embodying the unit shown in Fig. 2, the air is trapped in the tank 34 and this separation is facilitated by the displacement of water from the tank through the nipple 36 into the chamber 30 as air is released in the pipe 32, the baffle 31 directing the air bubbles into the pipe 32. The effective, cross-sectional, flow area of the nipple 36 is preferably equivalent to that of a one-half inch pipe or smaller, while the pipe 32 would be sized as indicated above for the pipe 23.

The system illustrated in Fig. 3 shows another method of utilizing the unit just described. The boiler 44 may be fired in any manner and a riser 45 is connected thereto with its lower end immersed in the boiler water just below the upper portion of the boiler. The opposite end of the riser is connected to a flow control valve 46 whose outlet is connected by a supply line 47 to one or more radiators (not shown) from which the water is returned to the boiler by a pipe 48 which includes a circulating pump 49. It will be understood that the pump is motor driven and thermally responsive to a thermostatic circuit in the same manner as the system shown in Fig. 1.

To accommodate expansion and to trap air in the system, one end of a pipe 50 is connected to the upper portion of the boiler while the opposite end is connected to a unit 51 which is similar to the unit illustrated in Fig. 2 and similarly related to an expansion tank 52.

In Fig. 4 is illustrated an alternative method of connecting the expansion tank to the system which accomplishes the above noted results. The numeral 53 designates any type of hot water boiler which is connected by a pipe 54, corresponding to the pipe 22 and nipple 36, to the water space 55 of an expansion tank 56, while a pipe 57, corresponding to the pipes 23 and 32, connects the boiler to the air space 58 of the tank. Supply and return lines 59 and 60, respectively, connect the boiler to radiators (not shown). This system may also include a flow control valve and circulating pump as described above and an air vent valve 25 is carried by the tank.

In Fig. 5 is illustrated a further modification wherein a portion of the main supply line incorporates a part of the passage connecting the boiler to the expansion tank. The numeral 63 designates a hot water heating boiler having attached to the top wall 64 thereof a pipe fitting 65 whose lower end extends through and well below the wall 64. The fitting 65 includes a main supply passage 66 for the hot water issuing from the boiler and to the upper end of the fitting is secured a flow control valve 67 of characteristic construction which is opened by a pump (not shown) and closes by gravity, and has connected thereto a supply pipe 68 leading to the radiators. A passage 69 is provided in the wall of the fitting with its lower end communicating with the boiler and not extending below the inner surface of the wall 64 and its upper end with a pipe 70. The latter pipe connects through branches 71 and 72 with the water and air spaces, respectively, of an expansion tank 73, the arrangement being identical with that shown in Fig. 1. If desired, the unit attachment illustrated in Fig. 2 may be employed. This construction possesses an advantage over that shown in Fig. 3 in that only one opening is required in the top of the boiler.

A further modification of the structure illustrated in Fig. 5 is shown in Fig. 6 wherein the numeral 74 designates a boiler having threaded in the top wall thereof the lower end of a pipe nipple 75, while the upper end of the nipple is threaded in the housing 76 of a flow control valve 77 having a valve element 78 which is opened by pump pressure and closed by gravity in the usual manner. The valve element 78 coacts with a valve seat 79 formed by a wall 80 in the housing and the upper end of a pipe 81 which extends through and is flush with the top side of the wall. The pipe 81 is generally concentric with and extends down through the nipple 75 with the lower end thereof disposed well below the boiler wall, and constitutes a part of the main supply line for conveying hot water through the flow control valve to the radiators (not shown).

As indicated in the drawings, the outside diameter of the pipe 81 is less than the internal diameter of the nipple 75 to thereby form an annular passage 82 whose lower end communicates with and does not extend below the inner surface of the top boiler wall. The passage 82 is continued in the valve housing by the space 83 below the wall 80 and communicating with this space is one end of a pipe 84 which corresponds to the pipe 70 in Fig. 5 and may be connected to the expansion tank by the devices shown in Fig. 1 or Fig. 2, or may be connected to any standard type of air vent as commonly used in the industry. The disposition of the lower end of the pipe 81 insures that water passing to the radiators will be substantially free from air bubbles, while the passage 82 is located to freely receive any bubbles that are released in the boiler.

A further arrangement for accomplishing the above results is illustrated in Fig. 7 wherein the numeral 85 designates a boiler having the usual supply and return lines 86 and 87 for connecting the boiler to a heating system. A pipe 88, corresponding to the pipe 22, connects the water space 89 of an expansion tank 90 to the return line 87, while a pipe 91 connects the boiler to the air space 92 of the tank. This system may be otherwise equipped as shown in Fig. 1.

It will be understood that any of the modifications discussed above may be used in a simple, thermo-gravitational system, i. e., one which does not include a circulating pump. Such systems may, however, include, if desired, a motor operated, flow control valve, as distinguished from a pump operated valve.

I claim:

1. In a closed hot water heating system, the combination of a boiler, an expansion tank, and pipe means connecting the tank to the system having at the tank end two branches communicating, respectively, with the water and air spaces of the tank, the water branch being sized to prevent two-way circulation therethrough.

2. In a closed hot water heating system having one or more radiators, the combination of a boiler, a weighted flow control valve, a pump thermally responsive to the heat demands of the radiators for forcibly circulating water through the system, an expansion tank, and pipe means connecting the tank to the system, the pipe means at the tank end having two branches communicating, respectively, with the water and air spaces of the tank, the water branch being sized to prevent two-way circulation therethrough.

3. A member for accommodating expansion in a closed, boiler equipped, hot water heating system comprising a tank, and pipe means for connecting the tank to the system, the pipe means at the tank end having two branches communicating, respectively, with the water and air spaces of the tank, the water branch being sized to prevent two-way circulation therethrough.

4. A member for facilitating separation of air from the water in a closed, boiler and expansion tank equipped, hot water heating system comprising a housing having a pair of chambers communicating with each other and with the system, one of the chambers having a pipe extending into the air space of the tank and the other chamber having a communication with the water space of the tank, the communication being sized to prevent two-way circulation therethrough whereby water in the tank is displaced into the housing when air bubbles in the pipe are released into the air space of the tank.

5. A member for accommodating expansion in a closed, boiler and expansion tank equipped, hot water heating system comprising a housing having a pair of chambers communicating with each other and with the system, one of the chambers having a pipe extending into the air space of the tank and the other chamber having a communication with the water space of the tank, the communication being sized to prevent two-way circulation therethrough whereby water in the tank is displaced into the housing when air bubbles in the pipe are released into the air space of the tank, a vent pipe extending through the first named pipe with its upper end located in the tank air space, and a valve for controlling the flow of air through the vent pipe.

6. In a closed hot water heating system having one or more radiators, the combination of a boiler, piping providing a circuit between the boiler and radiators and having its inlet disposed below the upper portion of the boiler, a weighted check valve in the piping controlling flow to the radiators, a pump thermally responsive to the heat demands of the radiators for circulating water through the piping, an expansion tank, and pipe means connecting the tank to the upper part of the boiler having at the tank end two branches communicating, respectively, with the water and air spaces of the tank, the water branch being sized to prevent two-way circulation therethrough.

7. In a closed hot water heating system, the combination of a boiler, an expansion tank, and pipe means, respectively, providing communication between the upper portion of the boiler and the air space of the tank and between the system and the water space of the tank, the water space pipe means being sized to prevent two-way circulation therethrough.

8. In a closed hot water heating system, the combination of a boiler, an expansion tank, and pipe means, respectively, providing communication between the upper portion of the boiler and the air space of the tank and between the water space of the tank and a water portion of the system below the water space of the tank, the water space pipe means being sized to prevent two-way circulation therethrough.

9. In a closed hot water heating system, the combination of a boiler, an expansion tank, and pipe means connecting the tank to the upper portion of the boiler and having at the tank end two branches communicating, respectively, with the water and air spaces of the tank, the water branch being sized to prevent two-way circulation therethrough.

10. In a closed hot water heating system having one or more radiators, the combination of a boiler, a weighted flow control valve, a pump thermally responsive to the heat demands of the radiators for forcibly circulating water through the system, an expansion tank, and pipe means connecting the tank to the upper portion of the boiler and having at the tank end two branches communicating, respectively, with the water and air spaces of the tank, the water branch being sized to prevent two-way circulation therethrough.

11. A member for facilitating separation of air from the water in a closed, boiler and expansion tank equipped, hot water heating system comprising a housing having a pair of chambers communicating with each other and with the system, one of the chambers having a pipe extending into the air space of the tank and the other chamber having a communication with the water space of the tank, the communication being sized to prevent two-way circulation therethrough whereby water in the tank is displaced into the housing when air bubbles in the pipe are released into the air space of the tank, and baffle means partially separating the chambers for directing air bubbles into the pipe.

12. A member for facilitating separation of air from the water in a closed, boiler and expansion tank equipped, hot water heating system comprising a housing having a pair of chambers communicating with each other and arranged for connection with the system, one of the chambers having a pipe extending into the air space of the tank and the other chamber having a communication with the water space of the tank, the communication being sized to prevent two-way circulation therethrough whereby water in the tank is displaced into the housing when air bubbles in the pipe are released into the air space of the tank.

13. In a closed hot water heating system having a boiler and an expansion tank, means for facilitating the separation of air from the water and its collection in the tank comprising pipe means adapted for connection to the upper portion of the boiler and having a two branch connection with the tank, one branch communicating with the water space of the tank and being sized to prevent two-way circulation through the branch and the other branch communicating with the air space of the tank.

14. A member for facilitating separation of air from the water in a closed, boiler and expansion tank equipped, hot water heating system comprising a housing having a pair of chambers communicating with each other and with the system, one of the chambers having a pipe extending into the air space of the tank and the other chamber having a pipe connection with the water space of the tank which is sized to prevent two-way circulation through the connection whereby water in the tank is displaced into the housing when air bubbles in the pipe are released into the air space of the tank.

15. In a closed hot water heating system, the combination of a boiler, an expansion tank, and pipe means, respectively, providing communication between the upper portion of the boiler and the air space of the tank and between the water space of the tank and a portion of the system below the water space of the tank, the last named pipe means being sized to prevent two-way circulation therethrough.

16. In a closed, forcibly circulated, hot water heating system, the combination of a boiler, a housing having a valve seat, a flow control valve operably related to the seat, and an outlet for connection to the radiators, a hot water supply pipe having its upper end communicating with the seat whereby flow through the pipe is controlled by the valve and its lower end extending through and well below the top wall of the boiler, a pipe nipple encircling the pipe in spaced relation thereto with its ends connected to the boiler top wall and housing, respectively, below the seat to thereby form a passage between the boiler and the interior of the housing below the seat, an expansion tank and pipe means connecting the tank to the passage and having at the tank end two branches communicating, respectively, with the water and air spaces of the tank, the water branch being sized to prevent two-way circulation therethrough.

17. In a closed hot water heating system having a boiler and an expansion tank, a housing having a valve seat, a flow control valve operably related to the seat, and an outlet for connection to the radiators, a hot water supply pipe having its upper end communicating with the seat whereby flow through the pipe is controlled by the valve and its lower end extending through and well below the top wall of the boiler, a pipe nipple encircling the pipe in spaced relation thereto with its ends connected to the boiler top wall and housing, respectively, below the seat to thereby form a passage between the boiler and the interior of the housing below the seat, and pipe means connecting the tank to the passage and having at the tank end two branches communicating, respectively, with the water and air spaces of the tank, the water branch being sized to prevent two-way circulation therethrough.

18. In a hot water heating system, a housing having a valve seat, a flow control valve operably related to the seat, and an outlet for connection to the radiators, a hot water supply pipe having its upper end communicating with the seat whereby flow through the pipe is controlled by the valve and its lower end extending through and well below the top wall of the boiler, a pipe nipple encircling the pipe in spaced relation thereto with its ends connected to the boiler top wall and housing, respectively, below the seat to thereby form a passage between the boiler and the interior of the housing below the seat, and a vent pipe connected to the passage.

19. In a closed, forcibly circulated, hot water heating system, the combination of a boiler, a supply pipe leading from the boiler and including in the wall thereof a passage communicating at one end with the upper part of the boiler, a flow control valve connected to the outlet of the pipe, an expansion tank, and pipe means connecting the tank to the opposite end of the passage and having at the tank end two branches communicating, respectively, with the water and air spaces of the tank, the water branch being sized to prevent two-way circulation therethrough.

20. In a closed hot water heating system having a boiler and an expansion tank, a main supply pipe leading from the boiler and including in the wall thereof a passage communicating at one end with the upper part of the boiler, and pipe means connected to the opposite end of the passage and having two branches adapted to communicate, respectively, with the water and air spaces of the tank, the water branch being sized to prevent two-way circulation therethrough.

21. In a closed hot water heating system having a boiler and an expansion tank, a main supply pipe leading from the boiler and including as a part thereof a passage communicating at one end with the upper part of the boiler, and pipe means connected to the opposite end of the passage and having two branches adapted to communicate, respectively, with the water and air spaces of the tank, the water branch being sized to prevent two-way circulation therethrough.

22. In a closed hot water heating system having a boiler and an expansion tank, a main supply pipe leading from the boiler and including as a part thereof a passage communicating at one end with the upper part of the boiler, and pipe means providing communication between the opposite end of the passage and the air and water spaces of the tank, respectively, the water space pipe means being sized to prevent two-way circulation therethrough.

23. In a closed hot water heating system having a boiler and an expansion tank, means for facilitating the separation of air from the water and its collection in the tank comprising pipe means, respectively, providing communication between the upper portion of the boiler and the air space of the tank and between the system and the water space of the tank, the water space pipe means being sized to prevent two-way circulation therethrough.

24. In a closed hot water heating system having a boiler and an expansion tank, means for facilitating the separation of air from the water and its collection in the tank comprising pipe means, respectively, providing communication between the upper portion of the boiler and the air space of the tank and between the water space of the tank and a portion of the system below the water space of the tank, the last named pipe means being sized to prevent two-way circulation therethrough.

25. In a closed hot water heating system having one or more radiators, the combination of a boiler, a flow control valve, a pump thermally responsive to the heat demands of the radiators for forcibly circulating water through the system, the opening and closing of the valve being concurrent with the operating and non-operating periods of the pump, respectively, an expansion tank, and pipe means, respectively, providing communication between the upper portion of the boiler and the air space of the tank and between the system and the water space of the tank, the water space pipe means being sized to prevent two-way circulation therethrough.

EDWIN B. TIDD.